United States Patent [19]

Forsyth

[11] Patent Number: 5,895,196
[45] Date of Patent: Apr. 20, 1999

[54] MIXING BOWL LIFT APPARATUS AND METHOD

[76] Inventor: Rodney J. Forsyth, Box 1689, Maple Creek, Saskatchewan, Canada, S0N 1N0

[21] Appl. No.: 09/023,005

[22] Filed: Feb. 12, 1998

[51] Int. Cl.⁶ .................................................. B65G 65/23
[52] U.S. Cl. ........................................ 414/421; 414/810
[58] Field of Search .................... 414/419–421, 414/680, 683, 810, 391, 392

[56] References Cited

U.S. PATENT DOCUMENTS

| | | | |
|---|---|---|---|
| 1,824,339 | 9/1931 | Foradas et al. | 414/420 X |
| 2,137,558 | 11/1938 | Aeschbach | 414/420 X |
| 3,330,429 | 7/1967 | Kress | 414/421 |
| 3,347,399 | 10/1967 | Ensinger | 414/421 |
| 3,782,566 | 1/1974 | McWilliams | 414/421 X |
| 4,447,185 | 5/1984 | Robinson et al. | 414/421 X |
| 4,543,028 | 9/1985 | Bell et al. | 414/420 X |
| 5,558,485 | 9/1996 | Haynes | 414/421 |

FOREIGN PATENT DOCUMENTS

| | | | |
|---|---|---|---|
| 519309 | 12/1955 | Canada | 414/421 |
| 311834 | 10/1971 | U.S.S.R. | 414/421 |
| 2223733 | 4/1990 | United Kingdom | 414/421 |

*Primary Examiner*—David A. Bucci
*Attorney, Agent, or Firm*—J. Winslow Young

[57] ABSTRACT

A mixing bowl lift apparatus and method for lifting a mixing bowl above a work table and partially inverting the mixing bowl to empty the contents thereof on the work table. The lift apparatus includes a lift framework having a pair of spaced lift arms extending outwardly from the lift framework at an obtuse angle. The lift framework is pivotally coupled between a pair of upright columns that are secured to a base plate bolted to the floor beneath the edge of the work table. The lift arms are configured with a C-shaped cross section so as to securely receive the circumferential, raised ridge on the mixing bowl. An electrically driven piston raises and lowers the lift arm assembly. The obtuse angle between the lift arms and the lift framework allows the lift arms to be raised beyond the vertical axis and thereby partially invert the mixing bowl above the work table. A linkage coupled to the electrically driven piston is operable to hold the electrically driven piston at a first position where it will raise and lower the lift arm assembly and at a second position where it will hold the lift arm assembly in a stowage position below the edge of the work table.

20 Claims, 4 Drawing Sheets

MIXING BOWL LIFT APPARATUS AND METHOD

BACKGROUND

1. Field of the Invention

This invention relates to the commercial baking equipment and, more particularly, to a novel lift apparatus and method for lifting a mixing bowl to empty the contents thereof on a work table.

2. The Prior Art

The commercial baking industry includes bakeries that range in size between those that produce thousands of loaves of bread and other pastry items per day to those which only produce several hundred. Those bakeries in this latter category are the primary interest in this invention. In particular, bread or pastry dough is produced in a batch process using caster-mounted mixing bowls having a capacity of at least one hundred kilograms or more. The ingredients for the dough are blended and kneaded in the mixing bowl at a mixing station. The kneaded dough is allowed to rise in the mixing bowl until it is ready to be shaped into loaves or other pastry products.

The mixing bowl containing the raised dough is wheeled to the work table for further processing. The full mixing bowl is quite heavy so that it must be lifted above the work table by use of either a forklift-type device or by means of an overhead hoist. Unless the forklift is specifically modified so as to be able to handle a mixing bowl it represents a particularly dangerous method for handling the mixing bowl. Not only must the mixing bowl be elevated above the work table it must also be partially inverted to empty its contents on the work table. However, inverting the mixing bowl significantly increases the danger that the mixing bowl will fall from the forklift. As a result, there have been documented cases wherein the mixing bowl has slipped off the forklift. Another problem associated with a forklift-type lifting device is that it is relatively expensive and occupies a significant amount of floor space when not in use. Also, most forklift devices require a significant amount of space for proper maneuvering in order to handle the mixing bowl.

The overhead hoist system presents a different set of problems in that it customarily resides in a fixed, overhead location and, thus, is not freely transportable from place to place as is the forklift. An overhead hoist creates another problem in that it can be the source for debris falling into the bread dough. This debris can be in the form of hoist lubricants, metal chips, and the like.

In view of the foregoing it would be an advancement in the art to provide a lifting mechanism that securely engages and lifts the mixing bowl. Another advancement in the art would be to provide a mixing bowl lifting apparatus that also partially inverts the mixing bowl at its elevated position so as to empty the contents of the mixing bowl directly on the work table. It would also be an advancement in the art to provide a mixing bowl lift apparatus that occupies very little floor space and folds readily into a storage position below the work table. Another advancement in the art would be to provide a mixing bowl lift apparatus that is stowable below the work table at a location where it will not interfere with persons working at the work table. Such a novel apparatus and method is disclosed and claimed herein.

BRIEF SUMMARY AND OBJECTS OF THE INVENTION

This invention is an apparatus and method for lifting a mixing bowl above a work table and tilting the mixing bowl to empty the contents of the mixing bowl on the work table. The structural framework for the lift mechanism is bolted to the floor beneath the edge of the work table and includes a lift arm assembly pivotally mounted to the structural framework. The lift arm assembly releasably engages the mixing bowl. An electrically driven piston raises and lowers the lift arm assembly. The placement of the pivot on the structural framework and the angular configuration of the lift arm assembly provides the appropriate tilting action at the end of the lifting movement to partially invert the mixing bowl above the work table to empty the contents on the work table. A linkage allows the lift arm assembly to be pivoted underneath the work table for stowage.

It is, therefore, a primary object of this invention to provide improvements in lift mechanisms for lifting mixing bowls.

Another object of this invention is to provide improvements in the method of lifting a mixing bowl.

Another object of this invention is to provide a pair of lift arms that are angled beyond the vertical when fully elevated in order to partially invert the mixing bowl engaged by the lift arms.

Another object of this invention is to provide a mixing bowl lift apparatus that securely engages the mixing bowl during the lifting and tilting operations.

Another object of this invention is to provide a mixing bowl lift apparatus that occupies a limited area of floor space.

Another object of this invention is to provide a mixing bowl lift apparatus that stores out of the way below the work table.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENT

Figure 1:
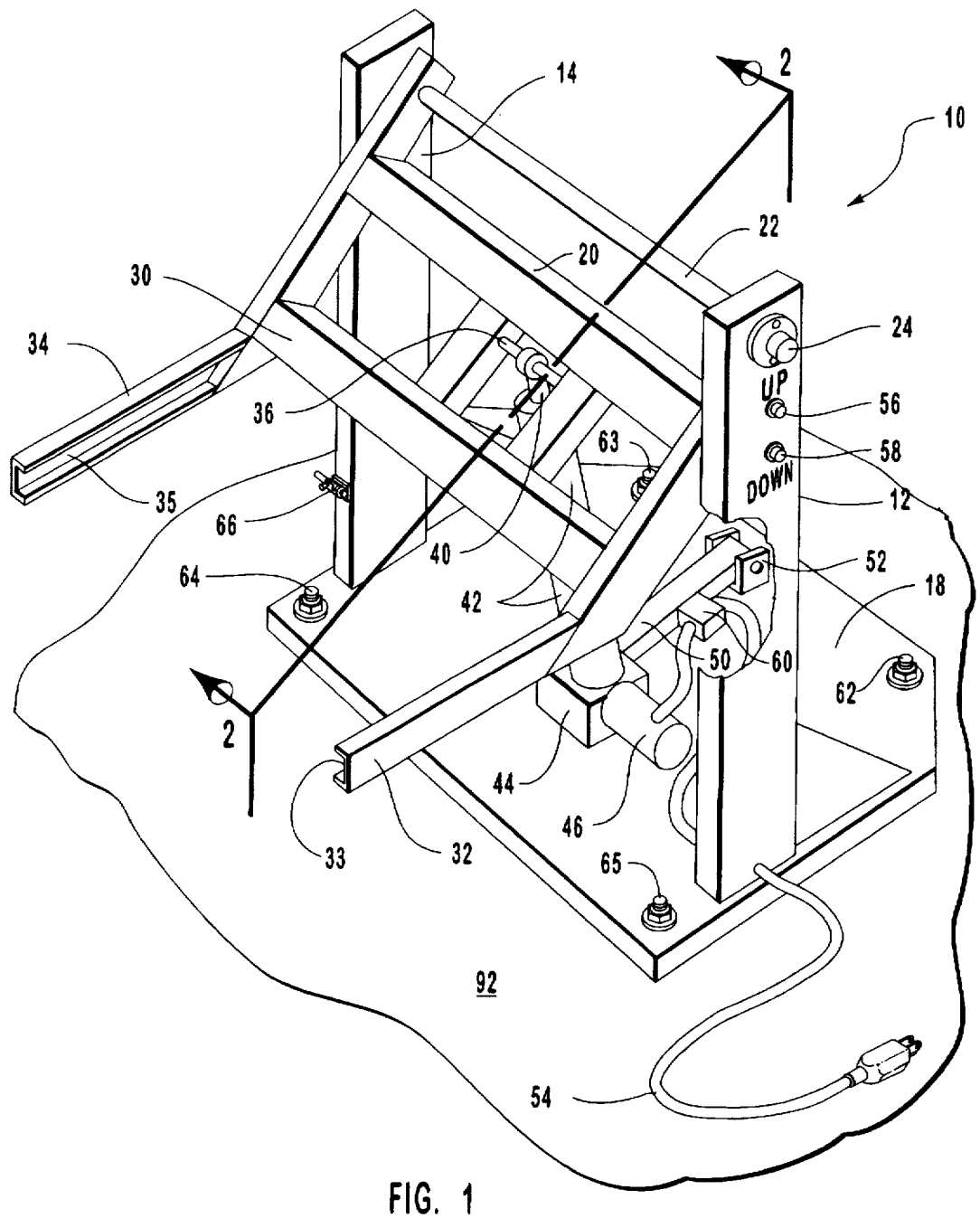
FIG. 1 is a perspective view of the mixing bowl lift apparatus of my novel invention.

The invention is best understood from the following description with reference to the drawing wherein like parts are designated by like numerals throughout and taken in conjunction with the appended claims.

General Discussion

The unique mixing bowl lift apparatus of this invention was specifically designed to occupy minimal floor space beneath the edge of the work table. Further, I specifically designed the lift mechanism with a linkage that allows the lift arm assembly to be stowed below the work table at in a position where it will not interfere with persons working at the work table.

3

The basic structure of the mixing bowl lift apparatus consists of a lift arm assembly pivotally supported between two vertical columns. The vertical columns are mounted in a spaced relationship to a base plate which is configured to be bolted to the floor at the desired location underneath an edge of the work table with the vertical columns extending upwardly beneath the edge of the work table. An axle extends between the two vertical columns to pivotally support the lift arm assembly between the two vertical columns. The lift arm assembly includes a lift frame having a pair of lift arms extending therefrom at an obtuse angle. The lift arms are designed to engagedly receive a mixing bowl placed between the lift arms. A piston is extended to push against the lift frame to cause the lift arms to raise the mixing bowl above the work table. The pivotal relationship between the lift arms and the vertical columns coupled with the angular offset of the lift arms to the lift frame results in the lift arms being rotated beyond the vertical thereby partially inverting the mixing bowl above the work table to empty the contents of the mixing bowl on the work table. Retraction of the piston lowers the lift arms and returns the mixing bowl to the floor. The piston is driven by a gear box mounted to an electric motor. The gear box, electric motor, and piston are positioned on the base plate by a stowage linkage. The stowage linkage has an overcenter configuration to allow the electric motor, piston, and hence, the entire lift arm assembly to be retracted and stowed beneath the edge of the work table.

Detailed Description

Figure 2:
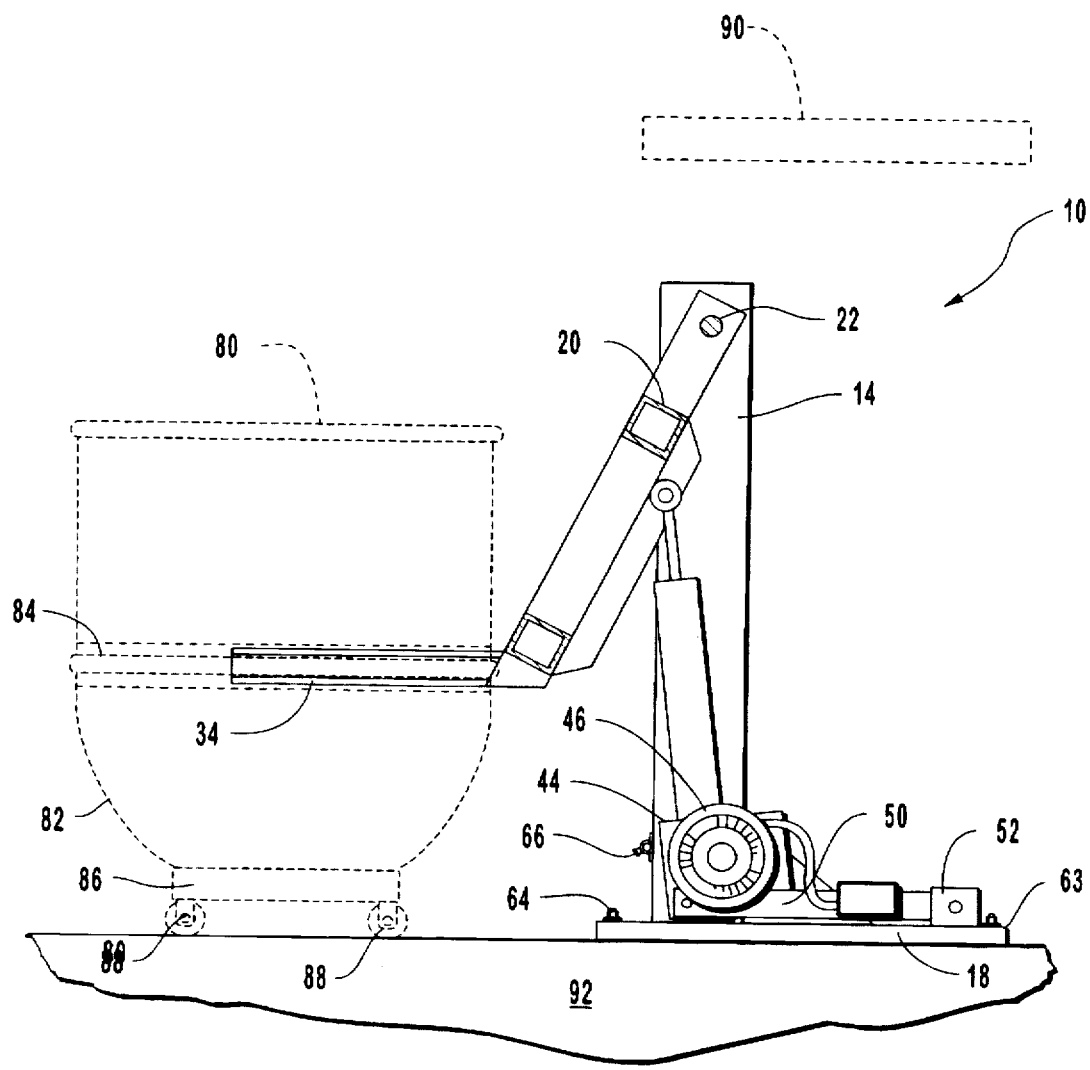
FIG. 2 is a cross sectional, side elevation of my mixing bowl lift apparatus shown in the environment of a mixing bowl and a work table and shown with the mixing bowl engaged thereby.
Figure 3:
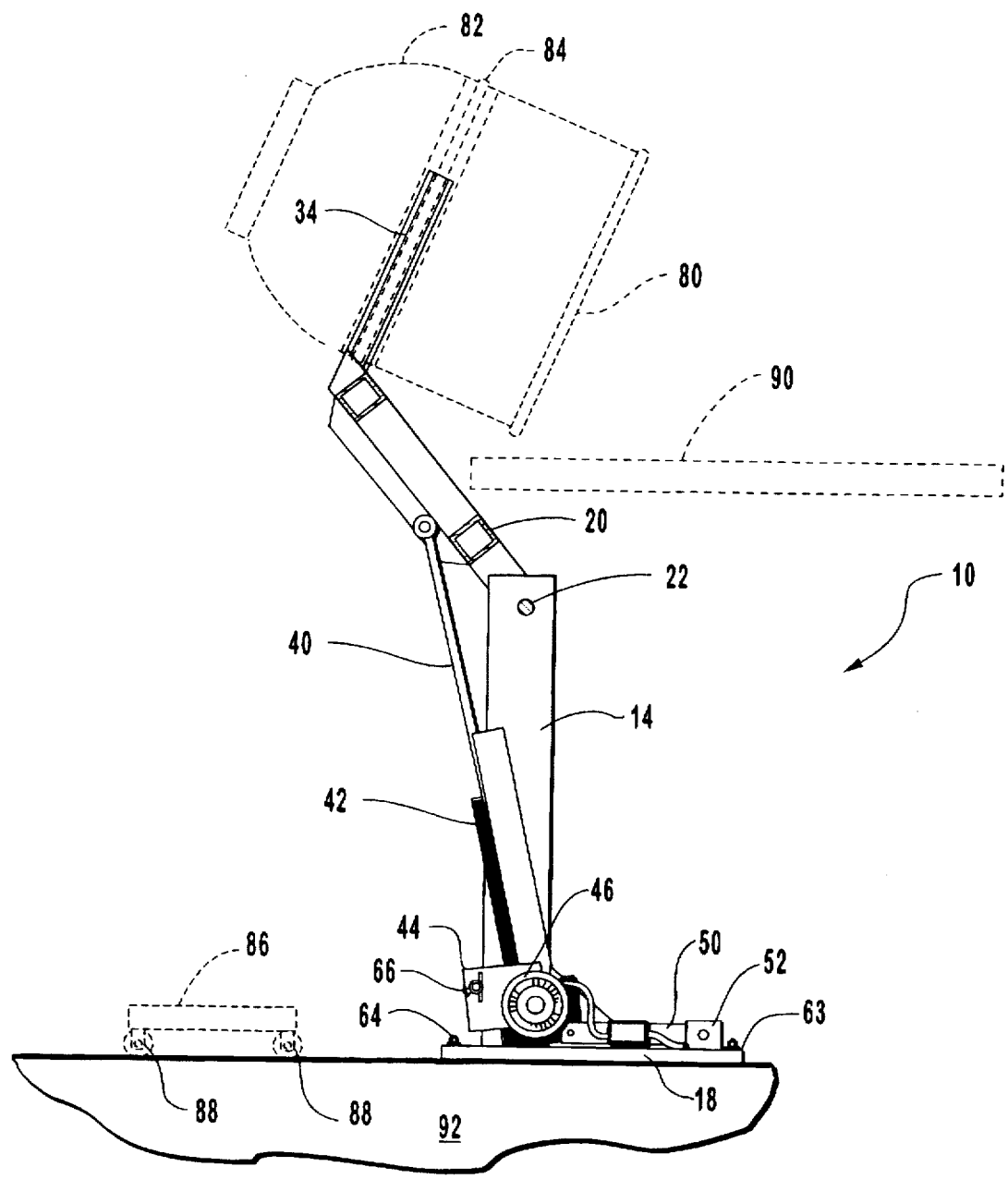
FIG. 3 is the cross sectional, side elevation of FIG. 2 showing the raised mixing bowl being tilted for emptying its contents on the work table.
Figure 4:
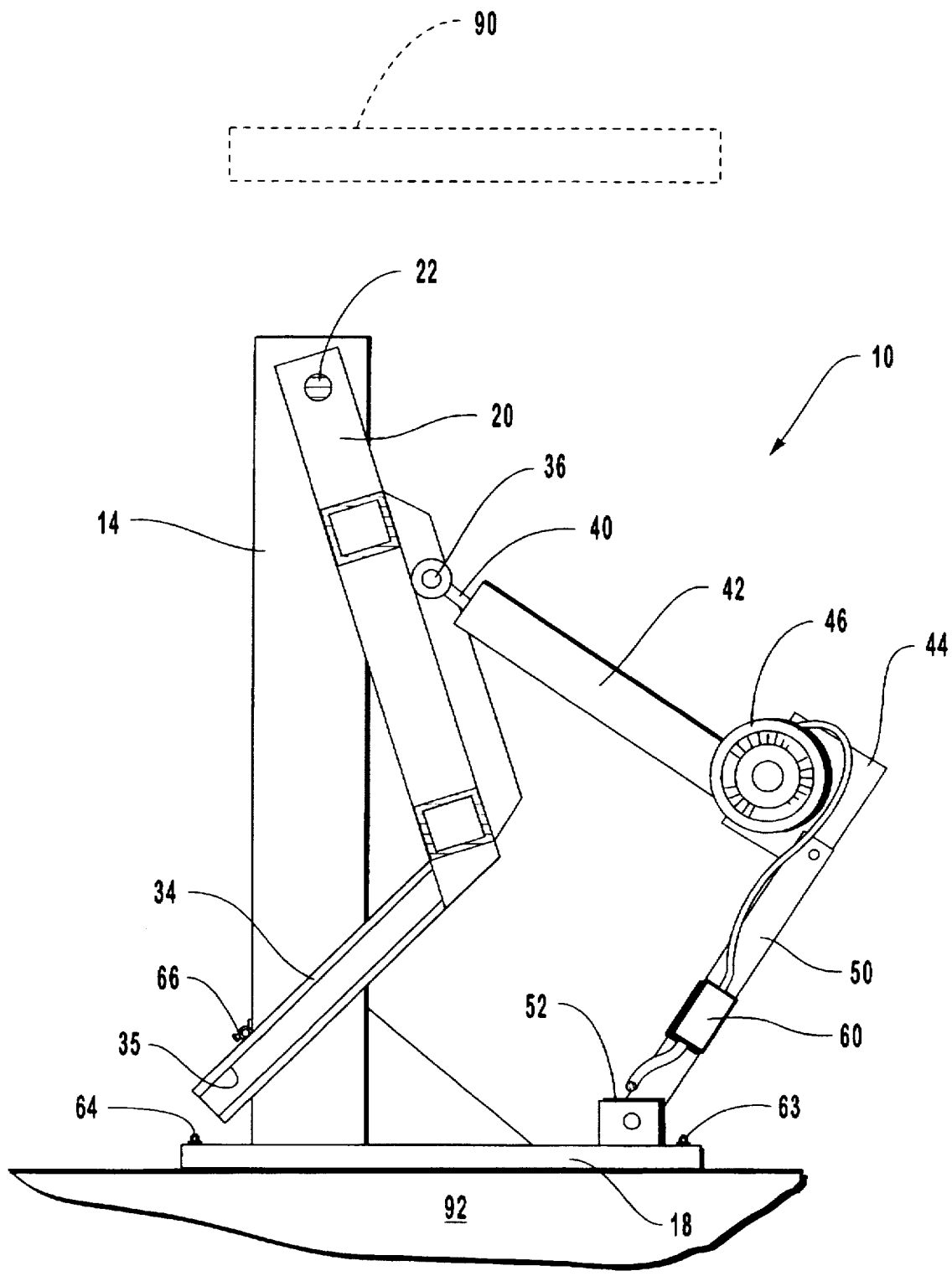
FIG. 4 is the cross sectional, side elevation of FIG. 2 showing the mixing bowl lift apparatus in the stowage position.

Referring now to FIG. 1, my novel mixing bowl lift apparatus is shown generally at 10 and includes a right vertical column 12 and a left vertical column 14 mounted to a base plate 18. Base plate 18 is secured to the floor 92 underneath a work table 90 (FIGS. 2–4) by a plurality of anchor bolts 62–65. A lift frame 20 is pivotally mounted to right vertical column 12 and left vertical column by an axle 22. A bearing 24 adjacent the upper of right vertical column 14 and an identical bearing (not shown) on left vertical column 14 (hidden in this particular view) supports axle 22. Lift frame 20 includes a basal framework 30 having a right lift arm 32 and a left lift arm 34 extending outwardly from basal framework 30 at an obtuse angle to the plane of basal framework 30, which angular relationship can be more readily observed in FIGS. 2–4. The dimensions of lift frame 20 are selectively coordinated with the dimensions of right vertical column 12 and left vertical column 14 to thereby accommodate a preselected size of mixing bowl 80 (FIGS. 2–4). All of the elements of basal framework 30 are not described in detail herein since any suitable framework can be used as the support structure for right lift arm 32 and left lift arm 34. Importantly, lift frame 20 must be constructed such that it is sufficiently robust in order to maintain its structural integrity when handling a heavy mixing bowl 80. Right lift arm 32 and left lift arm 34 are each configured with a C-shaped profile or right bowl clip 33 and left bowl clip 35, respectively. The open side of the C-shaped profile of right bowl clip 33 and left bowl clip 35 face each other. The internal dimensions of the C-shaped profile of right bowl clip 33 and left bowl clip 35 are specifically coordinated with the dimensions of a circumferential ridge 84 on mixing bowl 80 (FIGS. 2–4) as will be discussed more fully hereinafter.

Lift frame 20 is raised and lowered by a piston 40 pivotally mounted to basal framework 30 at a coupling 36. Piston 40 is electrically operated and is telescopically received in a cylinder 42 mounted on a gear box 44 of an electric motor 46. Operation of electric motor 46 drives gear box 44 which rotates a worm gear inside cylinder 42 to cause piston 40 to move telescopically relative to cylinder 42. Extension of piston 40 pushes lift frame 20 upwardly in a counterclockwise rotational movement about the pivot of axle 22. Electrical energy for electric motor 46 is supplied through an electrical lead 54 and is controlled by either an UP switch 56 or a DOWN switch 58. Gear box 44 rests against base plate 18 during movement of piston 40 and is pivotally mounted to one end of a linkage 50. The other end of linkage 50 is pivotally mounted to baseplate 18 at an anchor 52 to accommodate stowing lift frame 20 as will be discussed more fully hereinafter with respect to FIG. 4. A mercury switch 60 is mounted to linkage 50 and acts as a safety device to prevent electrical energy from reaching electric motor 46 when linkage 50 is elevated to the storage position shown in FIG. 4.

Referring now to FIG. 2, mixing bowl 80 is shown in its engagement position relative to lift frame 20. Mixing bowl 80 is a standard mixing bowl having a hemispherical bottom 82 and a circumferential ridge 84. Circumferential ridge 84 provides an engagement mechanism by which left bowl clip 35 of left lift arm 34 is able to engage the corresponding side of mixing bowl 80. The opposite side of mixing bowl 80 is similarly engaged by right bowl clip 33 (FIG. 1). Mixing bowl 80 rests upon a toroidal base 86 having a plurality of casters 88 which enable mixing bowl 80 to be wheeled from place to place. With mixing bowl 80 and, more particularly, circumferential ridge 84 engaged by left bowl clip 33 of left lift arm 34 and right bowl clip 35 of right lift arm 32 (FIG. 1), mixing bowl 80 is ready to be raised by my novel mixing bowl lift 10. Right lift arm 32 (FIG. 1) and left lift arm 34 are oriented at a height to accommodate slidingly receiving circumferential ridge 84 in right bowl clip 33 and left bowl clip 35 as mixing bowl 80 is moved between right lift arm 32 and left lift arm 34. The C-shaped cross-sectional profile of right bowl clip 33 and left bowl clip 35 securely engages both the upper and lower edges of circumferential ridge 84. This feature provides excellent safety while raising and lowering mixing bowl 80 as well as when mixing bowl 80 is partially inverted at the upper end of the lifting action as shown in FIG. 3.

Referring now also to FIG. 3, activation of UP switch 56 sends electrical energy to electric motor 46 which operates gear box 44 to cause piston 40 to extend from cylinder 42 thereby pivoting lift frame 20 about the pivot of axle 22. This action, when piston 40 is fully extended, results in right lift arm 32 and left lift arm 34 (FIG. 1) supporting mixing bowl 80 at a partially inverted orientation to cause the contents thereof (not shown) to be deposited on the surface of work table 90.

Referring now to FIG. 4, lift frame 20 is shown in its stowed position. In particular, linkage 50 has been raised from resting on base plate 18 as shown in FIGS. 1–3 thereby elevating electric motor 46, gear box 44, cylinder 42 and piston 40 while at the same time moving each of these elements to the rear of left vertical column 14. Simultaneously, lift frame 20 is retracted bringing left lift arm 34 into a downwardly oriented position. A latch 66 is then used to releasably secure the relative position of lift frame 20 against left vertical column 14. Importantly, raising linkage 50 opens mercury switch 60 so that no electrical power can be directed to electric motor 46. As seen in FIG. 4, essentially all of mixing bowl lift apparatus 10 is now stowed beneath work table 90 in a nonobstructive manner to persons (not shown) working at work table 90.

The Method

The novel method of this invention includes securing a pair of upright columns, right vertical column 12 and left vertical column 14, to a base plate 18. Base plate 18 is then bolted to floor 92 by a plurality of bolts, anchor bolts 62–65, at a position underneath an edge of work table 90. A lift frame 20 is pivotally mounted between right vertical column 12 and left vertical column 14 by an axle 22. Right lift arm 32 and left lift arm 34 extend outwardly from basal framework 30 of lift frame 20 at an obtuse angle thereto. The spatial separation between right lift arm 32 and left lift arm 34 is selectively predetermined to receive mixing bowl 80 therebetween. In particular, right lift arm 32 and left lift arm 34 are each configured with C-shaped profiles of right bowl clip 33 and left bowl clip 35, respectively, with the open portion of the C-shaped profiles being oriented toward mixing bowl 80. Mixing bowl 80 includes a raised circumferential ridge 84, the width of which is received in the open contour of the C-shaped profiles of right bowl clip 33 and left bowl clip 35 to thereby accommodate mixing bowl 80 being securely engaged between right lift arm 32 and left lift arm 34.

Piston 40 is coupled to lift frame 20 at coupling 36 at one end and extends from cylinder 42 on gear box 44. Gear box 44 is secured by a linkage 50 and rests against base plate 18 at the first position as shown in FIGS. 1–3. Linkage 50 is a rigid member pivotally joined between gear box 44 and base plate 18 at an anchor 52. Raising linkage 50 as shown in FIG. 4 causes linkage 50 to become an overcenter linkage thereby supporting electric motor 46 and gear box 44 above and behind anchor 52 in a second or stowage position. This stowage position also pulls piston 40 and lift frame 20 behind right vertical column 12 and left vertical column 14 to thereby place right lift arm 32 and left lift arm 34 in a nonobstructing location below the edge of work table 90. Latch 66 is mounted on left vertical column 14 and releasably engages left lift arm 34 to prevent inadvertent release of left lift arm 34 and right lift arm 32 from the stowage position of FIG. 4.

Electric motor 46 is configured as a reversible electric motor and is controlled by an UP switch 56 and a DOWN switch 58. Electric energy is supplied through electrical lead 54 and is controlled by mercury switch 60 mounted on linkage 50 so that when linkage 50 is raised to the stowage position shown in FIG. 4 electrical energy is prevented from reaching either UP switch 56 or DOWN switch 58 and, correspondingly, electric motor 46.

In operation, latch 66 is retracted and linkage 50 is reversed to lie against base plate 18 thereby elevating right lift arm 32 and left lift arm 34 into the horizontal position of FIGS. 1 and 2. Mixing bowl 80 is wheeled between right lift arm 32 and left lift arm 34 to slidingly engage circumferential ridge 84 in the C-shaped cross sectional profiles of right bowl clip 33 and left bowl clip 35 of each of right lift arm 32 and left lift arm 34, respectively. This engagement of mixing bowl 80 is highly secure and prepares mixing bowl 80 for being raised by mixing bowl lift apparatus 10.

The operator (not shown) presses UP switch 56 to energize electric motor 46 and to operate gear box 44. Operation of gear box 44 causes piston 40 to extend linearly from cylinder 42 and thereby raise lift frame 20 upwardly in a clockwise rotational movement about axle 22. As piston 40 reaches the end of its travel, as shown in FIG. 3, lift frame 20 is tilted upwardly. Since right lift arm 32 and left lift arm 34 extend outwardly from basal framework 30 at an obtuse angle, both right lift arm 32 and left lift arm 34 are oriented beyond the vertical. This orientation of right lift arm 32 and left lift arm 34 places mixing bowl 80 in a partially inverted configuration above work table 90 (as shown in FIG. 3) causing the contents thereof (not shown) to be deposited on work table 90.

With the contents of mixing bowl deposited on work table 90 mixing bowl 80 is lowered by the operator pressing DOWN switch 58 thereby reversing electric motor 46 to cause piston 40 to be retracted into cylinder 42 until right lift arm 32 and left lift arm 34 are again oriented in the horizontal position and mixing bowl 80 has been repositioned on toroidal base 86. Mixing bowl 80 is then wheeled away for further duties as a mixing bowl while mixing bowl lift apparatus 10 is returned to its stowage position. This is accomplished by raising linkage 50 while pivoting lift frame 20 rearwardly until left lift arm 34 can be again secured by latch 66.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A lift apparatus for lifting a mixing bowl above a work table comprising:

a stand having a platform and a pair of vertical uprights mounted to said platform in spaced relationship;

a lift assembly pivotally mounted to said vertical uprights;

engagement means on said lift assembly for engaging the mixing bowl;

lifting means for lifting said lift assembly to pivotally rotate said lift assembly relative to said vertical uprights; and linkage means for retracting said lift assembly beneath said table to a stowage position.

2. The lift apparatus defined in claim 1 wherein said platform includes securement means for securing said platform to the floor underneath the edge of the table.

3. The lift apparatus defined in claim 1 wherein said lift assembly comprises a lift frame and a pair of spaced lift arms extending outwardly from said lift frame, said lift arms including said engagement means.

4. The lift apparatus defined in claim 3 wherein said engagement means comprises an open channel on each of said lift arms, said open channels receiving a circumferentially oriented raised ridge on the mixing bowl.

5. The lift apparatus defined in claim 1 wherein said lifting means includes a piston and an electric motor for extending and retracting said piston.

6. The lift apparatus defined in claim 1 wherein said linkage means comprises a bar having a first end and a second end, said first end being pivotally mounted to said lifting means, said second end being pivotally mounted to said platform, said bar being pivotally positionable to a first position parallel to said platform to place said lifting means at a location for raising and lowering said lift assembly and a second position angularly offset from said platform to retract said lifting means and said lift assembly to the stowage position.

7. The lift apparatus defined in claim 6 wherein said bar includes a mercury switch for preventing the flow of electricity to said electric motor when said bar is raised from said first position.

8. A mixing bowl lift apparatus comprising:

a vertical support structure;

a lift arm assembly pivotally mounted to said vertical support structure adjacent an upper end of said vertical support structure;

engagement means on said lift arm assembly for releasably engaging the mixing bowl;

lift means for raising said lift arm assembly to an elevated position above a work table and lowering said lift arm assembly;

dump means on said lift arms for dumping contents of the mixing bowl on the work table; and stowage means for stowing said lift arms below the work table.

9. The mixing bowl lift apparatus defined in claim 8 wherein said vertical support structure comprises a pair of vertical columns mounted to a base plate, said base plate being boltable to a floor under an edge of the work table.

10. The mixing bowl lift apparatus defined in claim 8 wherein said lift arm assembly includes a lift frame and a pair of lift arms extending from said frame, said lift arms having a spaced relationship to receive the mixing bowl between said pair of lift arms, each of said lift arms having a C-shaped profile with an open portion of said C-shaped profile oriented toward the mixing bowl, the mixing bowl having a raised, circumferential ridge, said open portion of said C-shaped profile being dimensionally configured to receive the raised, circumferential ridge of the mixing bowl, said C-shaped profile thereby comprising said lift arm means on said lift arm assembly.

11. The mixing bowl lift apparatus defined in claim 10 wherein said dump means comprises said lift arms being angularly offset at an obtuse angle to said lift frame to thereby cause said lift arms to pivotally rotated beyond the vertical to thereby support the mixing bowl in a partially inverted orientation.

12. The mixing bowl lift apparatus defined in claim 8 wherein said lift means comprises a piston means for raising and lowering said lift arm assembly.

13. The mixing bowl lift apparatus defined in claim 12 wherein said piston means comprises a reversible electric motor, a gear box, and a linearly extensible and retractable piston, said reversible electric motor driving said gear box and said gear box extending and retracting said extensible and retractable piston as a function of the direction of rotation of said reversible electric motor.

14. The mixing bowl lift apparatus defined in claim 8 wherein said stowage means comprises a linkage pivotally interconnected between said lift means and said vertical support structure, said linkage placing said lift means at a first position wherein said lift means is operable to raise and lower said lift arm assembly and a second position wherein said lift means and said lift arm assembly are retracted to a rearward location.

15. The mixing bowl lift apparatus defined in claim 14 wherein said linkage includes a mercury switch to prevent the flow of electricity to said lift means when said lift means is placed at said second position.

16. The mixing bowl lift apparatus defined in claim 15 wherein said vertical support structure includes lock means for releasably locking said lift arm assembly in said second position.

17. A method for raising a mixing bowl above a work table and tilting the mixing bowl to dump contents of the mixing bowl on the work table comprising the steps of:

securing a vertical support structure to a floor beneath an edge of the work table;

preparing a lift arm assembly having a pair of lift arms for releasably engaging the mixing bowl;

pivotally mounting said lift arm assembly to said vertical support structure;

engaging the mixing bowl with said pair of lift arms;

raising said lift arm assembly to raise the mixing bowl above the work table;

partially inverting the mixing bowl over the work table by continuing to raise said lift arm assembly thereby placing said pair of lift arms beyond a vertical orientation thereby dumping the contents of the mixing bowl on the work table;

lowering the mixing bowl to the floor; and stowing said lift arm assembly beneath the edge of the work table.

18. The method defined in claim 17 wherein said raising step comprises coupling an electrically driven piston to said lift arm assembly and controlling said raising step and said lowering step by regulating the direction of travel of said electrically driven piston.

19. The method defined in claim 18 wherein said stowing step includes mounting said electrically driving piston on a linkage operable for placing said electrically driven piston in a first position for raising and lowering said lift arm assembly and a second position for stowing said lift arm assembly.

20. The method defined in claim 19 wherein said mounting step includes preventing the flow of electricity to said electrically driving piston by coupling a mercury switch to said linkage thereby interrupting said electricity when said lift arm assembly is stowed in said second position.

* * * * *